United States Patent
Kim et al.

(10) Patent No.: US 9,576,411 B2
(45) Date of Patent: Feb. 21, 2017

(54) APPARATUS AND METHOD FOR PROVIDING SECURITY KEYPAD THROUGH SHIFT OF KEYPAD

(71) Applicant: ELECTRONICS AND TELECOMMUNICATIONS RESEARCH INSTITUTE, Daejeon (KR)

(72) Inventors: Eunchan Kim, Daejeon (KR); Jae Min Park, Daejeon (KR); Cheol Oh Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 89 days.

(21) Appl. No.: 14/452,712

(22) Filed: Aug. 6, 2014

(65) Prior Publication Data
US 2015/0109102 A1  Apr. 23, 2015

(30) Foreign Application Priority Data
Oct. 18, 2013  (KR) .................. 10-2013-0124663

(51) Int. Cl.
*G05B 19/00* (2006.01)
*G07C 9/00* (2006.01)
(Continued)

(52) U.S. Cl.
CPC .......... *G07C 9/00142* (2013.01); *G06F 21/36* (2013.01); *G07F 7/1041* (2013.01)

(58) Field of Classification Search
CPC ..... G07C 9/00142; G06F 21/36; G07F 7/1041
See application file for complete search history.

(56) References Cited

U.S. PATENT DOCUMENTS 8,176,324 B1 * 5/2012 Krishnamurthy ..... G06F 3/0236 380/45
2006/0224523 A1 * 10/2006 Elvitigala ........... G06F 3/04886 705/64
(Continued)

FOREIGN PATENT DOCUMENTS

KR  10-2007-0010557 A  1/2007
KR  10-2009-0130455 A  12/2009
KR  10-2012-0136796 A  12/2012

OTHER PUBLICATIONS

Lee, Dong-Hyun et al, "Analysis of safety for secure keypads of smartphones," Korea Institute of Information Security & Cryptology, Oct. 2011, vol. 21, No. 7, pp. 30-37, Republic of Korea.

*Primary Examiner* — Quang D Pham
(74) *Attorney, Agent, or Firm* — LRK Patent Law Firm (57) ABSTRACT

An apparatus and method for providing a security keypad are provided. The apparatus for providing a security keypad includes a coordinate generation unit, a keypad output unit, and a key value processing unit. The coordinate generation unit computes a displacement by which a security keypad is to be shifted, and rearranges at least some of keys included in the security keypad by shifting the at least some keys so that the central axis of the security keypad is translated by the displacement. The keypad output unit displays the rearranged security keypad to a user. The key value processing unit processes key values in response to the user's input to the rearranged security keypad, and transfers the processed key values to an application for which the rearranged, security keypad is used.

10 Claims, 5 Drawing Sheets

(51) Int. Cl.
*G06F 21/36* (2013.01)
*G07F 7/10* (2006.01)

(56) References Cited

U.S. PATENT DOCUMENTS

| | | | | |
|---|---|---|---|---|
| 2008/0066167 A1* | 3/2008 | Andri | ................. | G06F 21/46 726/5 |
| 2010/0109920 A1* | 5/2010 | Spradling | ............... | G06F 21/36 341/23 |
| 2010/0175016 A1* | 7/2010 | Tian | ................... | G06F 3/04886 715/773 |
| 2011/0050576 A1* | 3/2011 | Forutanpour | ....... | G06F 3/04886 345/168 |
| 2011/0285656 A1* | 11/2011 | Yaksick | ............. | G06F 3/04886 345/173 |
| 2012/0112932 A1* | 5/2012 | May | ................... | G06F 1/1664 341/22 |
| 2012/0176310 A1* | 7/2012 | Nair | ................... | G06F 3/0213 345/157 |
| 2012/0268393 A1* | 10/2012 | Lee | ........................ | G06F 21/36 345/173 |
| 2012/0323788 A1* | 12/2012 | Keresman, III | ... | G06Q 30/0641 705/44 |
| 2013/0002562 A1* | 1/2013 | Leskela | ............... | G06F 3/04886 345/169 |
| 2013/0047236 A1* | 2/2013 | Singh | ..................... | H04L 63/08 726/7 |
| 2013/0091583 A1* | 4/2013 | Karroumi | ............. | G06F 3/0236 726/26 |
| 2013/0340091 A1* | 12/2013 | Phegade | ................ | G06F 21/36 726/27 |
| 2014/0096201 A1* | 4/2014 | Gupta | .................. | H04W 12/06 726/4 |
| 2014/0098141 A1* | 4/2014 | Sen | ..................... | G06F 3/04886 345/660 |
| 2014/0101595 A1* | 4/2014 | Kumara | .............. | G06F 3/04886 715/773 |
| 2014/0143858 A1* | 5/2014 | Brixel | .................... | G06F 21/36 726/19 |
| 2014/0173717 A1* | 6/2014 | Davis | .................... | G06F 21/36 726/18 |
| 2015/0100913 A1* | 4/2015 | Park | ........................ | G06F 21/83 715/773 |

* cited by examiner

APPARATUS AND METHOD FOR PROVIDING SECURITY KEYPAD THROUGH SHIFT OF KEYPAD

CROSS REFERENCE TO RELATED APPLICATION

This application claims the benefit of Korean Patent Application No. 10-2013-0124663 filed Oct. 18, 2013, which is hereby incorporated by reference in its entirety into this application.

BACKGROUND OF THE INVENTION

1. Technical Field

The present invention relates generally to technology for providing a security keypad for a handheld terminal through a shift of a keypad and, more particularly, to an apparatus and method for providing a security keypad, which are capable of changing the coordinates of some of keys included in a keypad by shifting the central axis of the security keypad.

2. Description of the Related Art

With a rapid increase in the use of mobile devices, such as smart phones, personal digital assistants (PDAs) and tablet personal computers (PCs), related applications have been, able to be easily installed and used anywhere through the Internet and open markets. Along with this, the presence of malware or malicious hacking programs disguised as normal applications has also increased, and thus the number of cases where personal information, such as text messages, contact information and location information stored in mobile devices, is leaked is increasing. In particular, if leakage related to financial programs for securities and banking occurs, there is a danger of economic damage because the financial programs deal with important information required for financial transactions, such as personal information, certificates, and passwords. Accordingly, various security measures and methods are provided.

As one of the weak points in the security of financial programs, there is a possibility that a password may be obtained by coordinate hacking. In order to overcome this security problem attributable to coordinate hacking, a method of randomly rearranging the coordinates of all the keys of a keypad is used. In the case of a keypad including a large number of keys, it is difficult for a user to immediately fed a key to be pressed. In general applications currently provided by financial institutions for user convenience provide a QWERTY keypad in which the order of arrangement of keys is maintained in each line of the keypad, but blanks are randomly disposed between the coordinates of the keys. In this case, however, the number of blanks is constant in each line. Accordingly, there is a strong possibility that a password may be leaked through the hacking of several inputs because the keys of a keypad do not considerably deviate from their original locations even when the arrangement of the keys is changed. For this reason, there is a need for a new keypad security method capable of providing both user convenience and the security of personal information in terms of rearrangement of the coordinates of the keys of a keypad.

As a related art, Korean Patent Application Publication No. 2007-0010557 discloses a method for preventing keypad hacking.

SUMMARY OF THE INVENTION

Accordingly, the present invention has been made keeping in mind the above problems occurring in the conventional an, and an object of the present invention is to change the coordinates of a keypad through a shift of the central axis of the keypad, thereby providing a user with both convenience and security when entering a password to a financial application using a handheld terminal.

Another object of the present invention is to provide a method of providing a security keypad, which is capable of expanding a range in which a security keypad may be placed compared to an existing screen region, thereby reducing the possibility of the leakage of key values by repetitive coordinate hacking.

In accordance with, an aspect of the present invention, there is provided a method of providing a security keypad, including computing a displacement by which a security keypad is to be shifted; rearranging at least some of keys included in the security keypad by shifting the at least some keys so that a central axis of the security keypad is translated by the displacement; displaying the rearranged security keypad to a laser; and processing key values in response to the user's input to the rearranged security keypad, and transferring the processed key values to an application for which, the rearranged security keypad is used.

The central axis may be the central axis of all the keys of the security keypad.

Rearranging at least some of the keys may include shifting predetermined function keys within a range in which the predetermined function keys do not deviate from a predetermined keypad screen region.

The displacement may be determined by a rearrangement key included in the security keypad, or may be determined in response to the user's manual input, such as a hand motion and motion detection.

The displacement may be determined between maximum and minimum, values that are differently set based on the security level of the application.

The range between the maximum and minimum values of the displacement may increase in proportion to an increase in the security level of the application.

The range between the maximum and minimum values of the displacement may not deviate from the predetermined keypad screen region.

Rearranging at least some of the keys may include, if a key that has been shifted deviates from the predetermined keypad screen region, rearranging the key by coordinates corresponding to the degree to which the key has deviated from the keypad screen region based on she start point, of the keypad screen region on a side opposite to a side of the keypad screen region from which the key has deviated.

Displaying, the rearranged security keypad may include changing one or more of the shape and color of keys that have deviated from the keypad screen region and have been rearranged, and then displaying the changed keys.

Displaying the rearranged security keypad may include shifting the rearranged security keypad in a lateral or vertical direction, stopping the rearranged security keypad in response to the user's input or automatically after a predetermined period of time has elapsed, and then displaying the rearranged security keypad.

In accordance with another aspect of the present invention, there is provided an apparatus for providing a security keypad, including a coordinate generation unit configured to compute a displacement by which a security keypad is to be shifted, and to rearrange at least some of keys included in the security keypad by shifting the at least some keys so that the central axis of the security keypad is translated by the displacement; a keypad output unit configured to display the rearranged security keypad to a user; and a key value processing unit configured to process key values in response to the user's input to the rearranged security keypad, and to transfer the processed key values to an application for which the rearranged security keypad is used.

The central axis may be the central axis of all the keys of the security keypad.

The coordinate generation unit may be further configured to shift predetermined function keys within a range in which the predetermined function keys do not deviate from a predetermined keypad screen region.

The displacement may be determined by a rearrangement key included in the security keypad, or may be determined in response to the user's manual input, such as a hand motion and motion detection.

The displacement may be determined between maximum and minimum values that are differently set based on a security level of the application.

The range between the maximum and minimum values of the displacement may increase in proportion to an increase in the security level of the application.

The range between the maximum and minimum values of the displacement may not deviate from the predetermined keypad screen region.

The coordinate generation, unit may be further configured to, if a key that has been shifted deviates from the predetermined keypad screen region, rearrange the key by coordinates by the degree to which the key has deviated from the keypad screen region based on a start point of the keypad screen region on a side opposite to a side of the keypad screen region from which the key has deviated.

The keypad output unit may be further configured to change one or more of the shape and color of keys that have deviated from the keypad screen region and have been rearranged, and to then display the changed keys.

The keypad output unit may be further configured to shift the rearranged security keypad in a lateral or vertical direction, to stop the rearranged security keypad in response to the user's input or automatically after a predetermined period of time has elapsed, and to then display the rearranged security keypad.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc., of components in the drawings may be exaggerated to make the description clear.

Embodiments of the present invention are described in detail below with reference to the accompanying drawings.

Figure 1:
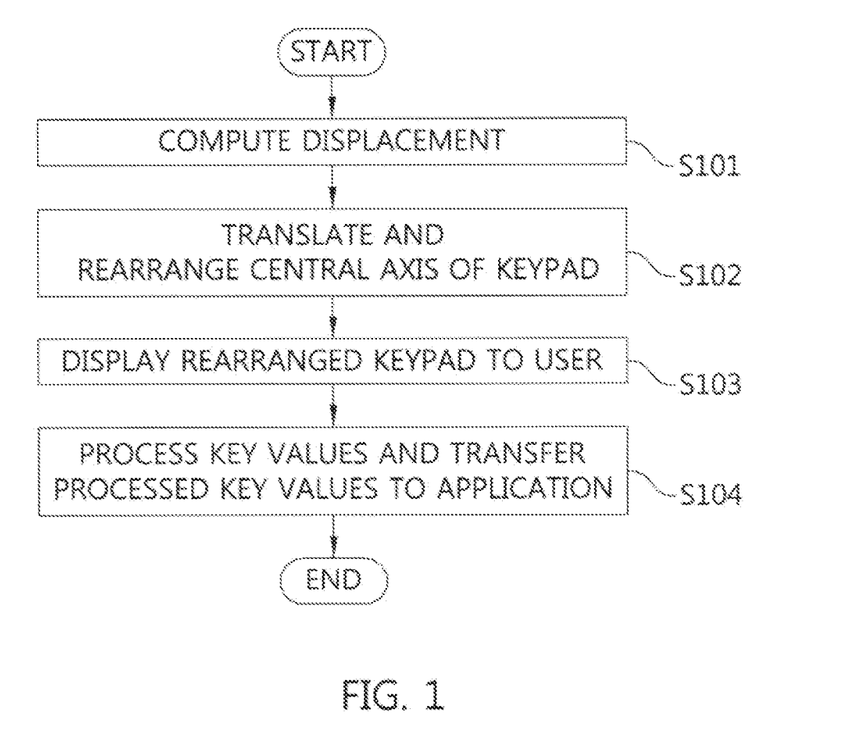
FIG. 1 is a flowchart illustrating a method of providing a security keypad through a shift of the security keypad according to an embodiment of the present invention.

FIG. 1 is a flowchart illustrating a method of providing a security keypad through a shift of the security keypad according to an embodiment of the present invention.

Referring to FIG. 1, in the method of providing a security keypad, first, a displacement by which the security keypad will be shifted is competed at step S101. The displacement by which the central axis of the security keypad will be shifted and placed is computed based on the central axis of the security keypad including all the keys of the security keypad. In this case, the displacement may have a range in which the central axis of the security keypad will be shifted and which is determined based on the security level of an application of a handheld terminal in which the security keypad is used. If an application of a handheld terminal requires high security, the location of the central axis of a security keypad may be greatly changed by increasing the range of a displacement in order to prevent a danger in which key values may be hacked via the coordinates of pressed keys. The security level may vary depending upon the application.

As described above, the range of a displacement may be designated based on the security level, of an application by setting the maximum and minimum values of the displacement depending upon the security level, of the application, and then the central axis of the security keypad may be shifted. The maximum and minimum values of the displacement may be calculated in the form of coordinates within a keypad screen region, and may be represented by the values of up, down, left and/left shifts. The range between the maximum and minimum values of the displacement may be determined within the keypad screen region. As the security level increases, the range between the maximum and minimum values increases.

Furthermore, the displacement may be determined by pressing a rearrangement key included in the security keypad, may be determined by manual input, such as a hand motion in which the user of a handheld terminal slides his finger up, down, to the left and/or to the right onto the screen, or motion, detection, or may be determined automatically.

At step S102, the central axis of the security keypad is rearranged by translating the central axis of the security keypad, by the displacement that is computed at step S101. In this case, the central axis of the security keypad is the central axis of all the keys included in the security keypad, and may be the central axis of the security keypad including common and function keys. When the central axis of the security keypad is translated by the computed displacement, the keys of the security keypad are also shifted by the displacement by which, the shitted central axis has been shifted. In this case, when all the keys are shifted, some predetermined function keys may be shifted within a range in which the predetermined function keys do not deviate from the keypad screen region.

If keys, other than the predetermined function keys, that are shifted when the central axis of the security keypad is translated deviate from the keypad screen region, the keys having deviated from the keypad screen region may be rearranged. If the keys having deviated from the keypad screen region are rearranged, they are rearranged at locations corresponding to coordinates by which the keys have deviated based on the start point of the keypad screen region on a side opposite to the side of the keypad screen region from which the keys have deviated. If a key that has been shifted deviates from the keypad screen region to the right, the key is rearranged by the degree to which the key has deviated based on the left, start point of the keypad screen region. If a key that has been shifted deviates from the keypad screen region to the left, the key is rearranged by the degree to which the key has deviated based on the right start point of the keypad screen region.

Thereafter, the rearranged security keypad is displayed to a user via a keypad output unit at step S103. When the keypad that has been shifted and rearranged, is displayed, the rearranged security keypad may be displayed to the user in such a manner that the keypad is shifted in a lateral or vertical direction and is stopped when the user touches a screen or automatically stopped after a predetermined period of time has elapsed.

Alternatively, when the rearranged security keypad is displayed to the user, the rearranged security keypad may be displayed in such a manner that the appearance of keys that have deviated from the keypad screen region and have been rearranged when all the keys are shifted is changed from the color or shape of those of the previous keypad so that the part of the keypad that has deviated from the keypad screen region and has been rearranged can be easily identified. If the appearance of the rearranged keys is changed, a user may easily identify shifted keys when the security keypad including many keys is rearranged through the shift of coordinates, thereby being able to facilitate the use of the security keypad.

Thereafter, key values are processed in response to a user's input to the rearranged security keypad, and the processed key values are transferred to an application for which the rearranged security keypad is used at step S104. The key values input by the user are determined by matching the coordinates of the rearranged security keypad with, the input key values, and the key values are transferred to the application so that the user can securely transfer sensitive information, such as a password and personal information, to the application.

Figure 2:
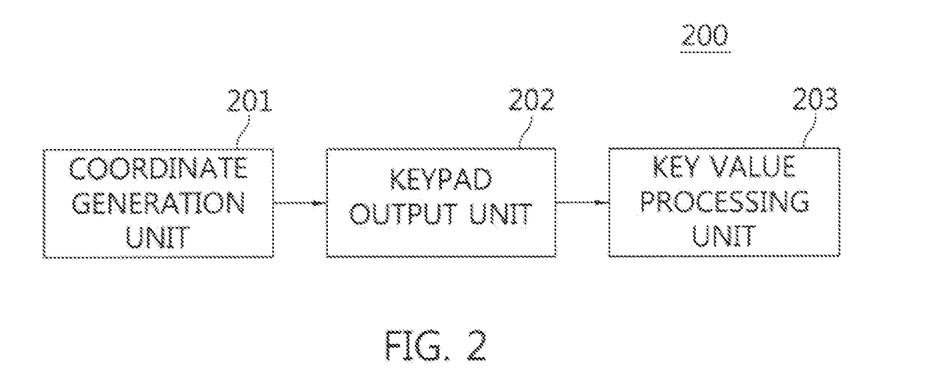
FIG. 2 is a block diagram illustrating an apparatus for providing a security keypad through a shift of a security keypad according to an embodiment of the present invention.

FIG. 2 is a block diagram illustrating an apparatus 200 for providing a security keypad through a shift of a security keypad according to an embodiment of the present invention.

Referring to FIG. 2, the apparatus 200 for providing a security keypad includes a coordinate generation, unit 201, a keypad output unit 202, and a key value processing unit 203.

The apparatus 200 for providing a security keypad is used for the security of a password and personal information that are entered when the user of a handheld user uses an application for finance or banking, and may provide higher security than an existing QWERTY method.

The coordinate generation unit 201 of the apparatus 200 for providing a security keypad computes a displacement by which the central axis of a security keypad will be shifted. In this case, the displacement may have a range that is determined based on the security level of an application in which the security keypad is used, if the application of a handheld terminal requires high security, the location of the central axis of a security keypad may be greatly changed by increasing the range of a displacement in order to prevent a danger in which key values may be hacked via the coordinates of pressed keys. The security level may vary depending upon the application.

As described above, the range of a displacement may be designated based on the security level of an application by setting the maximum and minimum values of the displacement depending on the security level of the application, and then the central axis of the security keypad may be shifted. The maximum and minimum values of the displacement may be calculated in the form of coordinates within a keypad screen region, and may be represented by the values of up, down, left and/left shifts. The range between the maximum and minimum values of the displacement may be determined within the keypad screen region. As the security level increases, the range between the maximum and minimum values increases.

Furthermore, the displacement may be determined by pressing a rearrangement key included in the security keypad, may be determined by manual input, such as a hard motion in which the user of a handheld terminal slides his finger up, down, to the left and/or to the right onto the screen, or motion detection, or may be determined automatically.

The coordinate generation unit 201 may translate the central axis of the security keypad by the computed displacement. In this case, the central axis of the security keypad is the central axis of all the keys included in the security keypad, and may be the central axis of the security keypad Including common and function keys. When the central axis of the security keypad is translated by the computed displacement, the keys of the security keypad are also shifted by the displacement by which the shifted central axis has been shifted. In this case, when all the keys am shifted, some predetermined function keys may be shifted within a range in which the predetermined function keys do not deviate from the keypad screen region.

If keys, other than the predetermined function keys, that are shifted when the central axis of the security keypad is translated deviate from the keypad screen region, the keys having deviated from the keypad screen region may be rearranged, if the keys having deviated from the keypad screen region are rearranged, they are rearranged at locations corresponding to coordinates by which the keys have deviated based on the start point of the keypad screen region on a side opposite to the side of the keypad screen region from which the keys have deviated. If a key that has been shifted deviates from the keypad screen region to the right, the key is rearranged by the degree to which the key has deviated based on the left start point of the keypad screen region. If a key that has been shifted deviates from the keypad screen region to the left, the key is rearranged by the degree to which the key has deviated based on the right start point of the keypad screen region.

The keypad output unit 202 displays the keypad, rearranged by the coordinate generation unit 201, to a user through. When the keypad that has been shifted and rearranged is displayed, the rearranged security keypad may be displayed to the user in such a manner that the keypad is shirred in a lateral or vertical direction and is stopped when the user touches a screen or automatically stopped after a predetermined period of time has elapsed.

Alternatively, when the rearranged security keypad is displayed to the user, the rearranged security keypad may be displayed in such a manner that the appearance of keys that have deviated from the keypad screen region and have been rearranged when all the keys are shifted is changed from the color or shape of those of the previous keypad so that the part of the keypad that has deviated from the keypad screen region and has been rearranged can be easily identified. If the appearance of the rearranged keys is changed, a user may easily identify shifted keys when the security keypad including many keys is rearranged through the shift of coordinates, thereby being able to facilitate the use of the security keypad.

The keypad processing unit 203 processes key values input by a user via the rearranged security keypad. The key values input by the user are determined by matching the coordinates of the rearranged security keypad wan the input key values, and the key values are transferred to the application so that, the user can securely transfer sensitive information, such as a password and personal information, to the application.

Figure 3:
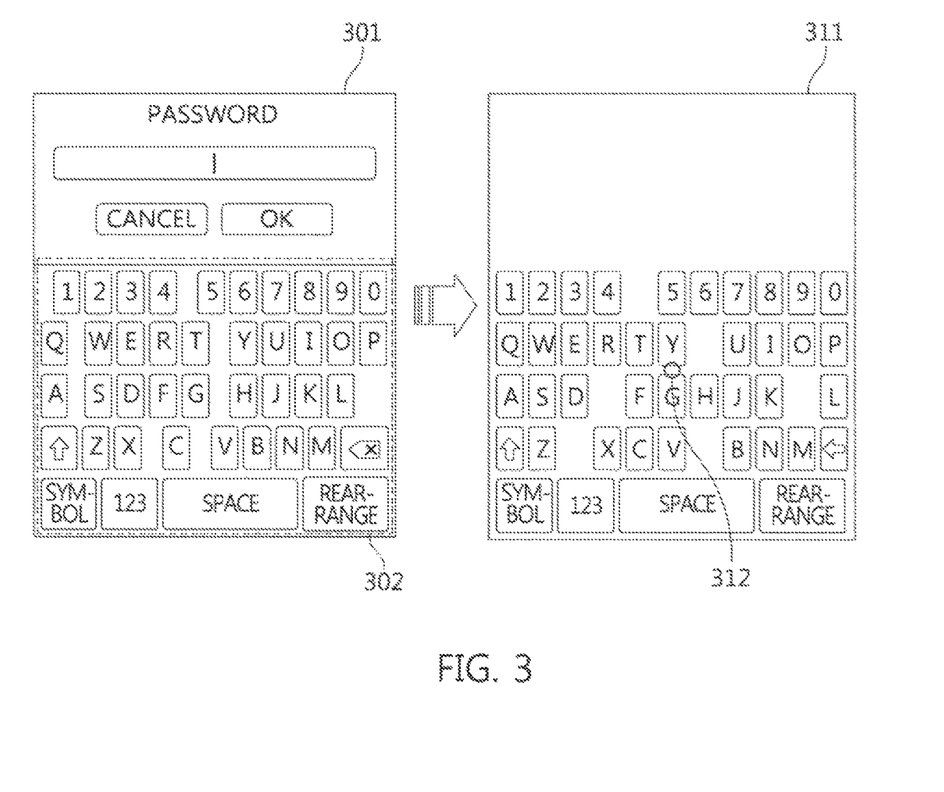
FIG. 3 is a diagram illustrating the conventional security keypad of a handheld terminal and the security keypad of a handheld terminal according to an embodiment of the present invention.

FIG. 3 is a diagram illustrating the conventional security keypad 302 of a handheld terminal and the security keypad of a handheld terminal according to an embodiment of the present invention.

Referring to FIG. 3, the security keypad according to this embodiment of the present invention has more various key coordinate values than the conventional security keypad. In the conventional security keypad 302, when the security keypad 302 is displayed on the screen of a handheld terminal, a user screen 301 and the conventional security keypad 302 are displayed together, as illustrated in FIG. 3. The coordinates of pressed keys are limited because the general location of the conventional security keypad 302 is not shifted. Although security is provided to a password and personal information using a keypad based on a QWERTY method, key values can be easily determined when only the coordinates of several pressed keys are determined by coordinate hacking.

In order to prevent this problem, the security keypad according to an embodiment of the present invention may be arranged in various ways by extending a keypad screen region 311 to increase the coordinates of keys that may be pressed compared to the conventional security keypad 302. When the security keypad according to an embodiment of the present invention is actually applied to a handheld terminal the coordinates of more keys can be obtained by extending the keypad screen region 311 to the highest degree in such, a way as to reduce the size of the user screen 301 or to change the arrangement of the keys.

The central axis 312 of the security keypad may be shifted across the extended keypad screen region 311. When the central axis 312 of the security keypad is translated, keys included in the security keypad are also shifted by the displacement by which the central axis 312 of the security keypad has been shifted. In this case, some predetermined function keys are shifted by the displacement by which the central axis 312 of the security keypad is translated, but may be shifted only within the range in which the predetermined function keys does not deviate from the keypad, screen region 311. If keys other than some predetermined function keys are shifted by the displacement by which the central axis 312 of the security keypad is translated and deviate from the keypad screen region 311, the keys having deviated front the keypad screen region 311 are rearranged, and the deviated keys may be rearranged at locations corresponding to coordinates by which they deviate from the start point of the keypad screen region on a side opposite to the side of the keypad screen region 311 from which the keys have been shifted.

The displacement by which the central axis 312 of the security keypad will be shifted may be determined by pressing the rearrangement key of the security keypad, may be determined by the user's hand motion of sliding a finger onto the screen of a handheld terminal or the manual method of detecting a motion, or may be determined automatically.

Such a displacement may have a different range in which the central axis 312 of the security keypad will be shifted depending on the security level of an application that is used by a user. If high security is required depending on the security level of an application, the range of a displacement may be wide and fee number of keys that deviate front the keypad screen region 311 and then rearranged may also increase, thereby being able to enhance security.

The security keypad rearranged based on the displacement may be displayed in such a manner that the security keypad is shifted in the keypad screen region 311 in a lateral or vertical direction, the shift of the security keypad is stopped when a user touches the screen of a handheld terminal or automatically stopped after a predetermined period of time has elapsed, and then the rearranged keypad is displayed. In this case, in the rearrangement process, the appearance, such as the color or shape, of the keys that have deviated from the keypad screen, region 311 and rearranged may be changed so that the user can easily identify the rearranged keys. If keys that have been rearranged are not easily identified because many keys are included in the security keypad of a handheld terminal, a user may experience inconvenience because be or she has to consume a lot of time to enter a password or personal information. It is efficient to identify rearranged keys so that a user can easily identify the rearranged keys.

Figure 4:
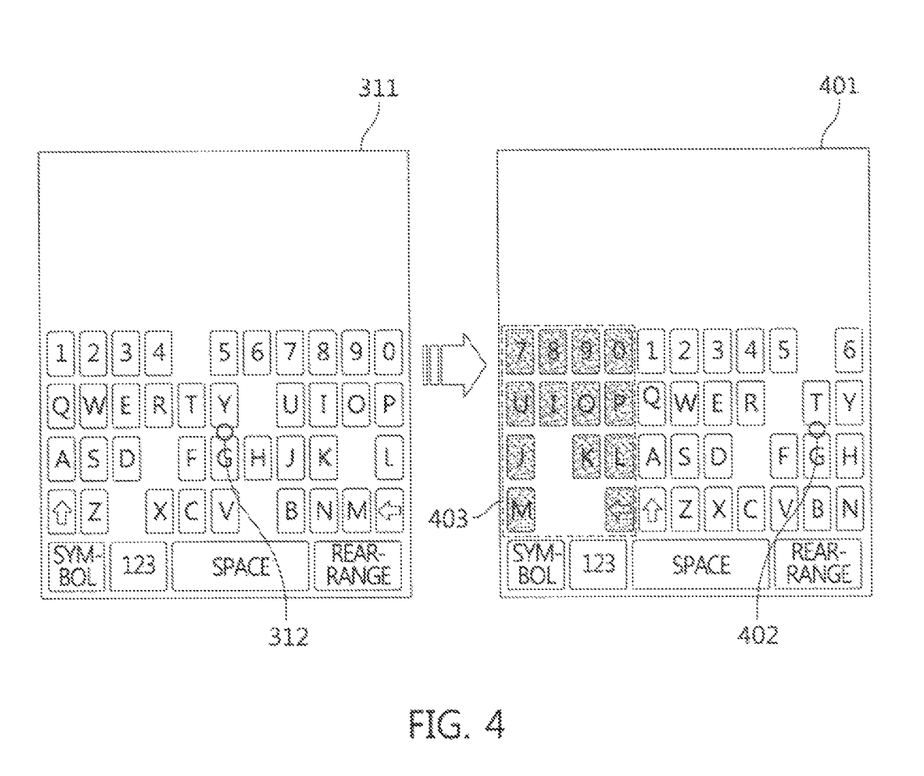
FIG. 4 is a diagram illustrating a security keypad in which keys are rearranged by horizontally translating the central axis of the security keypad according to an embodiment of the present invention.

FIG. 4 is a diagram illustrating a security keypad in which keys are rearranged by horizontally translating the central axis of the security keypad according to an embodiment of the present invention.

FIG. 4 illustrates the security keypad in which all the keys have been rearranged by horizontally translating the central axis 312 of the security keypad only in a lateral direction across the keypad screen region 311.

The central axis 402 of a security keypad in a keypad screen region 401 is shifted only in a lateral direction by some coordinates, and keys having deviated from the keypad semen region 401 are rearranged. In this case, in the security keypad of the keypad screen region 401 the keys "SYMBOL," "123," "SPACE," and "REARRANGE" corresponding to function keys need to be shifted to the right by the degree to which the central axis 402 of the security keypad is translated. However, the keys corresponding to the function keys are not shifted because the keys deviate from the keypad screen region 401 if they are shifted.

The keys of the security keypad other than predetermined function keys are shifted across the keypad screen region 401 by the degree to which the central axis 402 of the security keypad is translated. In this case, the part 403 of the security keypad that has been shifted in a lateral direction deviates from the keypad screen region 401 to the right. The part 403 of the keypad that has deviated from, the keypad screen region 401, as described above, may be rearranged by the degree to which the part 403 of the keypad that has deviated based on the left start point of the keypad screen region 401. Accordingly, keys placed at the left, start point of the security keypad prior to the arrangement and keys placed on the right side of the part 403 of the security keypad that has deviated from the keypad screen region 401 and rearranged, may be rearranged to come into contact with each other. The appearance of keys, such as the color or shape of the keys, corresponding to the part 403 of the rearranged security keypad may be changed so that a user can easily identify the rearranged keys.

Figure 5:
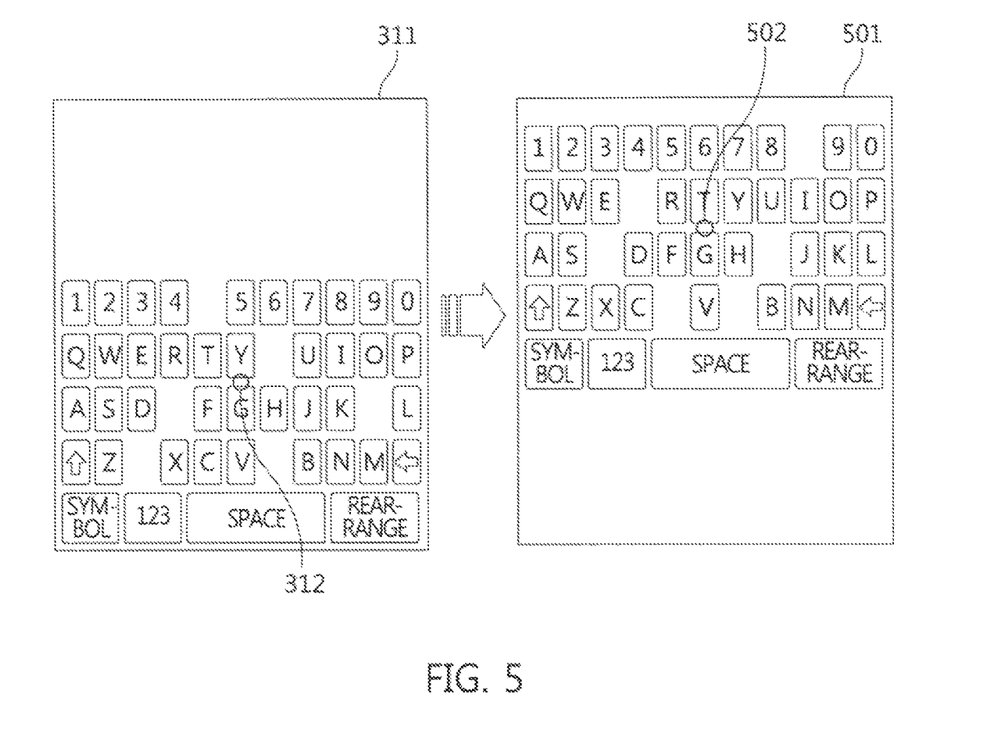
FIG. 5 is a diagram illustrating a security keypad in which keys are rearranged by vertically translating the central axis of the security keypad according to an embodiment of the present invention.

FIG. 5 is a diagram illustrating a security keypad in which keys are rearranged by vertically shifting the central, axis of the security keypad according to an embodiment of the present invention.

FIG. 5 illustrates the security keypad in which all the keys have been rearranged by translating the central axis 312 of the security keypad only in a vertical direction across the keypad screen region 311.

The security keypad of a keypad screen region 501 has been rearranged by translating the central axis 502 of the security keypad only in a vertical direction by some coordinates. The security keypad looks as if it has act been considerably rearranged because the central axis 502 of the security keypad has been shifted only in a vertical direction within a range in which the security keypad does not deviate from the keypad screen region 501. However, the coordinates of all the keys included in the security keypad have been changed because the coordinates of the central axis 502 of the security keypad have been changed, in general, a conventional method of providing a security keypad, which is provided by financial institutions, is a QWERTY method in which the order of arrangement of keys is maintained in each, line of a keypad and blanks are disposed between the coordinates of the keys. In the case of the QWERTY keypad, the number of blanks in each line of the keypad is constant, and keys do not deviate from their original locations even when the locations of the blanks are changed. Accordingly, there is a strong possibility that a password or personal information Input by a user may be leaked through repetitive coordinate hacking. In contrast, the security keypad illustrated in FIG. 5 may considerably reduce a possibility that information may be leaked through coordinate hacking because the coordinates of all keys are changed by the shift of the central axis 502 of the security keypad.

Figure 6:
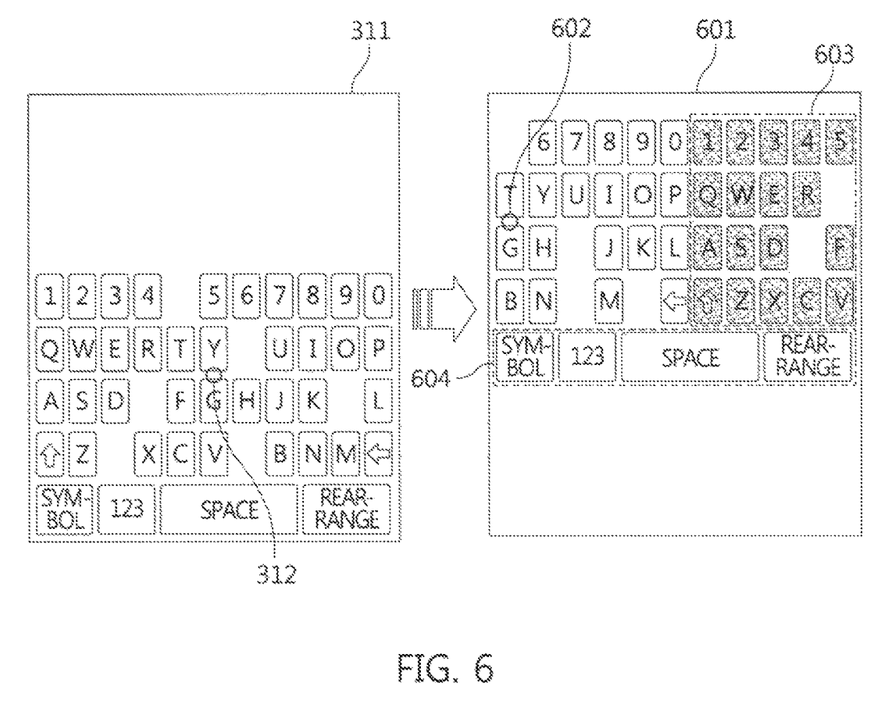
FIG. 6 is a diagram illustrating a security keypad in which keys are rearranged by shifting the central axis of the security keypad in lateral and vertical directions according to an embodiment of the present invention.

FIG. 6 is a diagram illustrating a security keypad in which keys are rearranged by shifting the central axis of the security keypad in lateral and vertical directions according to an embodiment of the present invention.

FIG. 6 illustrates the security keypad in which all the keys have been rearranged by translating the central axis 312 of the security keypad in lateral and vertical directions across the keypad screen, region 311.

In the security keypad of a keypad screen region 601, the central axis 602 of the security keypad has been shifted in lateral and vertical directions by some coordinates, and keys having deviated from the keypad screen region 601 have been rearranged. In this case, in the security keypad of the keypad screen region 601, the keys "SYMBOL," "123" "SPACE," and "REARRANGE" corresponding to function keys 604 need to be shifted in a left and upward, direction by the degree to which the central axis 602 of the security keypad has been shifted. However, the keys corresponding to the function keys 604 are not shifted to the left, but may be shifted up only because the keys deviate from the keypad screen, region 601 if they are shifted in the left and upward direction.

The keys of the security keypad other than the predetermined function keys 604 are shifted, across the keypad screen region 601 by the degree to which the central axis 602 of the security keypad has been shifted. In this case, the part 603 of the security keypad that has been shitted deviates from the keypad screen region 601 to the left, and the part 603 of the security keypad that has deviated from the keypad screen region 601, as described above, may be rearranged based on the right start point of the keypad screen region 601. Accordingly, keys placed at the right start point of the security keypad prior to the arrangement and keys placed on the left side of the part 603 of the security keypad that has deviated from the keypad, screen region 401 and rearranged may be rearranged to come into contact with each other.

As described above, at least one embodiment of the present invention has the advantage of changing the coordinates of a keypad through a physical shift of the central axis of the keypad, thereby providing a user with both convenience and security when entering a password to a financial application using a handheld terminal.

At least one embodiment of the present invention has the advantage of providing a method of providing a security keypad, which is capable of expanding a range in which a security keypad may be placed compared to an existing screen region, thereby reducing the possibility of the leakage of key values by repetitive coordinate hacking.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a security keypad of a handheld terminal, the method comprising:

receiving an input, indicating a security level of an application;

computing a displacement, according to the security level, by which the security keypad is to be shifted;

translating a central axis of the security keypad based on the displacement;

rearranging at least some of keys of the security keypad, the at least some keys being shifted according to the central axis of the security keypad based on the displacement;

displaying the rearranged security keypad to a user via an output unit of the handheld terminal according to the displacement;

processing key values in response to the user's input of the rearranged security keypad, and transferring the processed key values to the application for which the rearranged security keypad is used, wherein the displacement is computed based on a range between maximum and minimum values that are differently set based on the security level of the application, the maximum and minimum values being calculated in form of coordinates within a predetermined keypad screen region of the output unit;

wherein the range between the maximum and minimum values of the displacement does not deviate from a range set by the predetermined keypad screen region, the range between the maximum and minimum values of the displacement increasing in proportion to an increase in the security level of the application;

wherein said rearranging the at least some of the keys comprises shifting predetermined function keys within a range in which the predetermined function keys do not deviate from a range set by a predetermined keypad screen region; and wherein said rearranging the at least some of the keys comprises, in response to detection of a change of a key of the at least some of the keys shifted deviates from the predetermined keypad screen region, starting to rearrange the key by coordinates by a degree to which said key has deviates from the predetermined keypad screen region based on a start point of the predetermined keypad screen region on a side opposite to a side of the predetermined keypad screen region from which said key has deviated.

2. The method of claim 1, wherein the central axis is a central axis of all the keys of the security keypad.

3. The method of claim 1, wherein the displacement is computed in response to detection of at least one of a hand motion and a motion detection associated with a manual input.

4. The method of claim 1, wherein said displaying the rearranged security keypad comprises changing at least one of a shape or color of keys corresponding to the displacement that having been deviated and rearranged from the keypad screen region, and displaying the changed shape or color of keys.

5. The method of claim 4, wherein said displaying the rearranged security keypad comprises
shifting the rearranged security keypad in a lateral or vertical direction, stopping the rearranging the at least some of the keys of the security keypad in response to detection of an input or automatically stopping upon detection of a predetermined period of time having been elapsed, and displaying the rearranged security keypad.

6. An apparatus for providing a security keypad of a handheld terminal, the apparatus comprising:
in response to detection of an input indicating a security level of an application, a coordinate generation unit configured to compute a displacement by which a security keypad is to be shifted, to translate a central axis of the security keypad based on the displacement, and to rearrange at least some of keys of the security keypad by shifting the at least some of the keys according to the central axis of the security keypad based on the displacement according to the security level;
a keypad output unit configured to display the rearranged security keypad according to the displacement; and
a key value processing unit configured to process key values in response to the user's input of the rearranged security keypad and to transfer the processed key values to the application for which the rearranged security keypad is used,
wherein the displacement is computed based on a range between maximum and minimum values that are differently set based on the security level of the application, the maximum and minimum values being calculated in form of coordinates within a predetermined keypad screen region of the output unit;
wherein the range between the maximum and minimum values of the displacement does not deviate from a range set by the predetermined keypad screen region, the range between the maximum and minimum values of the displacement increasing in proportion to an increase in the security level of the application;
wherein said rearranging the at least some of the keys comprises shifting predetermined function keys within a range in which the predetermined function keys do not deviate from a range set by a predetermined keypad screen region; and
wherein said rearranging the at least some of the keys comprises, in response to detection of a change of a key of the at least some of the keys shifted deviates from the predetermined keypad screen region, starting to rearrange the key by coordinates by a degree to which said key has deviates from the predetermined keypad screen region based on a start point of the predetermined keypad screen region on a side opposite to a side of the predetermined keypad screen region from which said key has deviated.

7. The apparatus of claim 6, wherein the central axis is a central axis of all the keys of the security keypad.

8. The apparatus of claim 6, wherein the displacement is computed in response to detection of at least one of a hand motion and a motion detection associated with a manual input.

9. The apparatus of claim 6, wherein the keypad output unit is further configured to
change at least one of a shape or color of keys corresponding to the displacement that having been deviated and rearranged from the keypad screen region, and displaying the changed shape or color of keys.

10. The apparatus of claim 9, wherein the keypad output unit is further configured to
shift the rearranged security keypad in a lateral or vertical direction,
to stop the rearrangement of the security keypad in response to detection of an input or automatically to stop upon detection of a predetermined period of time having been elapsed, and
to display the rearranged security keypad.

* * * * *